United States Patent [19]

Klobucar

[11] Patent Number: 4,627,967

[45] Date of Patent: * Dec. 9, 1986

[54] PHOSPHAZENE TRIMER PURIFICATION

[75] Inventor: W. Dirk Klobucar, Baton Rouge, La.

[73] Assignee: Ethyl Corporation, Richmond, Va.

[*] Notice: The portion of the term of this patent subsequent to Jul. 29, 2003 has been disclaimed.

[21] Appl. No.: 658,307

[22] Filed: Oct. 5, 1984

[51] Int. Cl.[4] ............................................. C01B 25/10
[52] U.S. Cl. .................................. 423/300; 23/295 R
[58] Field of Search ........................ 423/300; 23/295 R

[56] References Cited

U.S. PATENT DOCUMENTS 4,175,113 11/1979 Fieldhouse ........................... 423/300
4,382,914 5/1983 Horie et al. .......................... 423/300

FOREIGN PATENT DOCUMENTS 3144751 5/1983 Fed. Rep. of Germany ...... 423/300
1014865 12/1965 United Kingdom ................ 423/300
242860 3/1968 U.S.S.R. ............................... 423/300

*Primary Examiner*—John Doll
*Assistant Examiner*—Wayne A. Langel
*Attorney, Agent, or Firm*—Donald L. Johnson; John F. Sieberth; Joseph D. Odenweller

[57] ABSTRACT

Polymerization grade phosphonitrilic chloride trimer is made by reacting $NH_4Cl$ and $PCl_5$ in a solvent (e.g. monochlorobenzene) to form a crude trimer solution, filtering the solution to remove unreacted $NH_4Cl$, distilling a portion of the solvent to form a hot concentrate, cooling the concentrate to obtain a precipitate, distilling the precipitate at reduced pressure to first remove a forecut and then a heart-cut of polymerization grade phosphonitrilic chloride trimer.

20 Claims, No Drawings

PHOSPHAZENE TRIMER PURIFICATION

BACKGROUND

High molecular weight linear phosphonitrilic chloride polymers are used to make a broad range of useful polyphosphazenes by substitution of the chlorine atoms with various groups such as phenoxide, alkylphenoxide, fluoroalkoxide and the like. These polyphosphazenes can be used to make articles such as foam insulation, old-rings, hydraulic seals, wire and cable insulation, hose liners and the like. The high molecular weight linear phosphonitrilic chloride polymers used to make the various substituted polyphosphazenes can be made by the thermal polymerization of cyclic phosphonitrilic chloride trimer preferably using a catalyst as described in U.S. Pat. Nos. 4,123,503 and 4,226,840. Not all trimer can be successfully polymerized to form a linear polyphosphonitrilic chloride. Early attempts at the thermal polymerization of phosphonitrilic chloride trimer lead to the formation of hard, cross-linked polymers that were of little use. The secret to obtaining linear polymers rather than the hard, cross-linked polymers was found to be related to the purity of the phosphonitrilic chloride trimer. Various methods have been tried to purify trimer to obtain trimer that could be successfully polymerized to high molecular weight linear polymers. Such purified trimers are referred to herein as "polymerization grade trimers". Various purification methods are described in U.S. Pat. Nos. 3,008,799; 3,378,353; 3,379,510; 3,677,720; 3,694,171; 3,952,086; 4,175,113 and GB Pat. No. 2,114,111.

SUMMARY

It has now been discovered that polymerization grade phosphonitrilic chloride trimer can be consistently obtained from crude trimer by forming a solution of the crude trimer in a solvent such as monochlorobenzene, heating the solution to distill off solvent forming a concentrate, cooling the concentrate to precipitate trimer, separating the precipitated trimer from the solvent phase and distilling the separated precipitate to first remove a small forecut and then distill a major heart-cut of polymerization grade phosphonitrilic chloride trimer.

DESCRIPTION OF THE PREFERRED EMBODIMENTS

A preferred embodiment of the invention is a process for purifying impure cyclic phosphonitrilic chloride trimer to obtain polymerization grade trimer, said process comprising
(a) forming a hot solution of impure phosphonitrilic chloride trimer,
(b) cooling said hot solution to form a crystalline precipitate,
(c) separating said crystalline precipitate from the liquid solvent phase and
(d) distilling the separated crystalline precipitate to obtain said polymerization grade trimer.

Solvents which can be used include any inert liquid which will dissolve the crude trimer when hot (e.g. 50°-100° C.) but precipitate the trimer content when cooled (e.g. −10° to 30° C.). These include toluene, xylene, hexane, heptane, octane, carbon tetrachloride, chloroform, 1,1,2-tri-chloroethane, 1,1,2,2-tetrachloroethane, 1,1,1-tri-chloroethane, perchloroethane, chlorobenzene, dichlorobenzene, bromobenzene, chlorotoluene, dichlorotoluene, chlorobromobenzene and the like including mixtures thereof. Of these the more preferred solvents are the halogenated benzenes such as monochlorobenzene, dichlorobenzene, trichlorobenzene, monobromobenzene, dibromobenzene, chlorobromobenzene and the like including mixtures thereof. The most preferred solvent is monochlorobenzene.

The initial trimer solution can be made by merely dissolving the impure phosphonitrilic chloride trimer in an appropriate solvent. The initial solution should include sufficient solvent to maintain the crude trimer including impurities in solution at elevated temperatures. The crude trimer contains impurities such as higher cyclics including tetramer, pentamer and the like as well as some oligomeric products. Generally, the initial solution contains in excess of 50 weight percent solvent and preferably in excess of 70 weight percent solvent and about 5-30 weight percent crude phosphonitrilic chloride trimer. Any solids that remain undissolved should be removed by filtration.

The solution is then heated to distill off a portion of the solvent to form a hot concentrate. The distillation can be conducted at atmospheric pressure or at reduced pressure. Preferably vacuum is applied to moderate the temperature in the re-boiler. Frequently it is not necessary to apply vacuum at the start of the solvent distillation but towards the end of the distillation vacuum is applied to keep the temperature of the residual concentrate from exceeding about 200° C. and preferably below 175° C. and most preferably below about 150° C. The distillation is continued until the residual hot concentrate has a trimer concentration which will cause precipitation of trimer upon cooling of the concentrate to temperatures in the range of −10 to about 40° C. and preferably upon cooling to ambient temperature. Preferably the hot concentrate will contain less than 50 weight percent solvent and more preferably less than about 40 weight percent solvent. Using monochlorobenzene as the solvent, good precipitation has been achieved with a concentrate containing about 25-40 weight percent monochlorobenzene and the balance crude trimer.

The hot concentrate is then allowed to cool to a temperature such that a substantial portion of the dissolved trimer precipitates. Preferably at least 50 weight percent and more preferably at least 60 weight percent of the dissolved trimer is precipitated on cooling. The cooled concentrate can be at temperatures ranging from about −10° C. or lower up to about 40° C. Preferably the cooled concentrate is near ambient temperature, e.g. 20°-30° C.

The precipitated crystalline trimer is then separated from the solvent phase. This can be done by conventional means such as filtration or centrifugation. Filtration has been used in development work. It is then preferred to wash the separated precipitate with an aliphatic hydrocarbon that can be easily removed from the precipitate by evaporation or during the initial portion of the subsequent distillation. Aliphatic hydrocarbons having a boiling temperature of about 50°-150° C., more preferably about 60°-90° C. can be used. Some examples are hexane, heptane, octane, petroleum ethers and the like including mixtures thereof. Alternatively cold monochlorobenzene or other halogenated solvents can be used.

The crystalline trimer is next placed in a distillation vessel. It is preferred that the trimer be handled under an inert atmosphere such as a nitrogen atmosphere. The distillation apparatus need not be a multi-plate rectification column. A simple distillation unit is adequate although a multi-plate distillation unit can be used. The trimer is heated above its melting point (appx. 115° C.) to melt the trimer. Preferably vacuum is applied while heating to assist in removal of residual solvents. The molten trimer is then heated to about 130°–200° C., more preferably about 150°–175° C. and the pressure is reduced until distillation occurs. Generally the pressure will be in the range of about 10–600 mm Hg absolute depending on temperature. Excellent results have been achieved at a reduced pressure of about 6–40 Torr at a liquid temperature range of about 140–220° C. from the start to the finish of the distillation.

Preferably a forecut is removed which contains low boiling impurities. The amount of forecut removed can be 0.1 weight percent or more of the crystalline precipitate charged to the distillation vessel. More preferably the forecut is at least 1.0 weight percent of the distillation charge. There is no real upper limit but excessive forecut removal will lower the recovery of purified trimer and thus be uneconomical. A good range to operate in is to remove about 1–10 weight percent of the precipitated trimer charged to the distillation as a forecut.

After the forecut is removed and segregated, a middlecut or heart-cut is distilled over which represents the polymerization grade trimer. Distillation of the heart-cut can be continued until the re-boiler liquid temperature approaches temperatures which cause decomposition or polymerization or until no further trimer distills over at the temperature/pressure conditions at which the main portion of the trimer distilled. It is preferred that the re-boiler liquid should not exceed about 200° C.

A highly preferred way to obtain the initial crude cyclic phosphonitrilic chloride trimer solution is to make the crude trimer in the same solvent used for crystallization. Thus, a highly preferred embodiment of the invention is a process for making polymerization grade cyclic phosphonitrilic chloride trimer, said process comprising (a) reacting ammonium chloride with phosphorus pentachloride in an inert solvent at 100°–160° C. to form a solution of impure phosphonitrilic chloride trimer, (b) distilling a portion of said solvent from said solution to obtain a hot concentrate containing less than 50 weight percent solvent, (c) cooling said hot concentrate to form a precipitate of phosphonitrilic chloride trimer, (d) separating said precipitate from the solvent phase and distilling said precipitate to recover polymerization grade phosphonitrilic chloride trimer.

In a still more preferred embodiment step (e) is conducted by first removing a small forecut of 0.1–10 weight percent of the precipitate, more preferably 0.5–5 weight percent of the precipitate and then continuing the distillation to remove a heart-cut of polymerization grade phosphonitrilic chloride trimer.

Examples of solvents have been listed previously. The preferred solvents are the same halogenated benzenes such as monochlorobenzene, monobromobenzene, dichlorobenzene, chlorobromobenzene and the like including mixtures thereof. The most preferred solvent is monochlorobenzene.

The crude trimer is made by the known procedure of reacting ammonium chloride and phosphorus pentachloride in a solvent. Instead of ammonium chloride it is possible to use the combination of $NH_3$ and HCl which is equivalent to $NH_4Cl$. Likewise, the combination of $PCl_3$ and $Cl_2$ can be used as the equivalent of $PCl_5$. In making the phosphonitrilic chloride cyclic trimer, the stoichiometric mole ratio is 1:1. However, in order to maximize formation of cyclics it is preferred to use a slight excess of $NH_4Cl$. A useful reactant ratio is about 1–1.5 moles of $NH_4Cl$ per mole of $PCl_5$. A more preferred ratio is about 1.05–1.25:1.0.

Preferably the reaction is conducted by slowly adding the $PCl_5$ to the $NH_4Cl$ slurried in the reaction solvent over a 4 hour period at reaction temperature of about 100–160° C.

The amount of solvent should be such that the resultant reaction mixture contains more than 50 weight percent solvent, more preferably in excess of 60 weight percent solvent and most preferably about 70–95 weight percent solvent.

Following the addition of the $PCl_5$, the mixture of $NH_4Cl$ and $PCl_5$ in the solvent (e.g. monochlorobenzene) is stirred at reaction temperature for a period sufficient to form a substantial amount of cyclic phosphonitrilic chloride.

A useful reaction temperature is about 100°–160° C., more preferably about 110°–150° C. and most preferably about 120°–140° C. In some cases a pressure system will be required to achieve the higher temperature because of the solvent boiling point. For example, monochlorobenzene boils at about 132° C. at atmospheric pressure so above atmospheric pressure would be required to exceed this temperature. However good yields of cyclic phosphonitrilic chlorides high in trimer can be achieved in monochlorobenzene at temperatures of about 120°–130° C. so use of a pressure reactor is not required. Also conducting the reaction in a refluxing solvent makes temperature control much easier.

The reaction to form the crude trimer solution from $NH_4Cl$ and $PCl_5$ is usually complete in about 3–5 hours including $PCl_5$ addition time and post-addition cook depending upon reaction temperature. At a reaction temperature of 125° C. the reaction is complete in about 5 hours.

Following the formation of the initial solution of crude trimer there is generally some unreacted $NH_4Cl$ remaining. This should be removed at this stage. This can be done by centrifuging or by filtration.

The clear filtrate is then heated to distill off solvent to form a hot concentrate in the same manner as previously described. The precipitation from the hot concentrate and distillation of the precipitate is likewise conducted as previously described.

The following examples serve to show how the process is conducted.

EXAMPLE 1

In a reaction vessel was placed 9787 ml monochlorobenzene and 802.5 grams of finely divided $NH_4Cl$. Over a 5 hour period 2496 grams of $PCl_5$ in 5600 ml monochlorobenzene was added to the stirred mixture at 124° C. Stirring was continued at reaction temperature for an additional hour. The resultant solution was then filtered. The filtrate was then concentrated by distilling off monochlorobenzene under vacuum. Final solvent distillation conditions were about 85° C. at 10 Torr re-boiler liquid temperature. The resultant concentrate contained about 32 weight percent monochlorobenzene and the remainder was the crude trimer. The hot concentrate was allowed to cool to room temperature and then further cooled to −10° C. forming a crystalline precipitate. The precipitate was recovered by filtration under nitrogen and washed with cold heptane. The precipitate (206 grams) was then placed in a round bottom flask fitted with a distillation head. The precipitate was heated while 20 inches Hg vacuum was applied. Heating was continued up to a flask temperature of 158° C. while pressure was gradually reduced to 40 Torr. During this stage a forecut was distilled out amounting to 20.3 grams. Following removal of the forecut, a heart-cut (157 grams) was distilled at 100°–137° overhead at 15 Torr. During the distillation the re-boiler reached a maximum temperature of 178° C. The heart-cut analyzed by $^{31}$P-NMR as 98.37 weight percent cyclic phosphonitrilic chloride trimer and 1.63 weight percent tetramer.

Polymerization

The above polymer grade phosphonitrilic chloride trimer (30 g) was placed in a clean glass ampule together with 36 mg of triphenyl phosphate—$BCl_3$ complex (cf U.S. Pat. No. 4,226,840). The ampule was sealed under vacuum and heated at 220° C. for 10 hours. The ampule was then cooled and broken and the polymer was dissolved in a cyclohexane. At this stage the solution was analyzed by $^{31}$P-NMR to determine the conversion of trimer to linear polyphosphonitrilic chloride. The linear polyphosphonitrilic chloride was then coagulated by adding heptane in an amount twice as much as the cyclohexane. The solvent was decanted and the coagulate was washed with heptane and decanted. The coagulate was then dissolved in 150 ml toluene and evaporated to dryness in a vacuum oven. The LVN in deciliters/gram, dl/g ("limiting viscosity number") was determined on a solution of 0.33 g polymer in 100 ml toluene containing 0.5 weight percent tri-n-octylamine using an Ubbelohde Viscosimeter. The LVN is a measure of molecular weight. Preferred linear phosphonitrilic chloride polymers have an LVN of about 0.8–1.75, more preferably 1.0–1.5. The linear polyphosphonitrilic chloride had a light color and an LVN of 1.3 dl/g.

EXAMPLE 2

This reaction was conducted in the same manner as Example 1 except that the hot concentrate was only cooled to room temperature for precipitation. The purified cyclic phosphonitrilic chloride analyzed 99.75 weight percent trimer and 0.25 weight percent tetramer. The conversion to a high molecular weight (LVN 1.5 dl/g) gel free polymer was 64%.

EXAMPLE 3

This reaction was conducted in the same manner as Example 2 except the reaction temperature in the trimer synthesis step was 130° C. and the polymerization time was 16 hours. The purified cyclic trimer analyzed 99.92 weight percent trimer and 0.08 weight percent tetramer. Conversion to a gel free colorless linear high molecular weight (LVN 1.0) phosphonitrilic chloride polymer was 68%.

Surprisingly neither distillation nor crystallization alone will consistently yield a polymerization grade cyclic trimer. Even when the trimer analyzes very pure, it was found that it would not consistently polymerize to a light colored gel free linear high molecular weight polymer.

EXAMPLES 4–7

In these comparative examples crude cyclic phosphonitrilic chloride was made in the monochlorobenzene following the same procedure described in Example 1 except that the crude trimer synthesis temperature was 128° C. The resultant solution was filtered to remove unreacted $NH_4Cl$ and then distilled in a three-plate Oldershaw distillation column at a 1:1 reflux ratio and a reduced pressure of 27–30 Torr. The trimer cut was removed at 147°–154° C. and were analyzed by $^{31}$P-NMR to be apparently very pure as shown in the following table.

TABLE 1

| Example | Trimer | Tetramer |
|---------|--------|----------|
| 4 | 99.76 | 0.24 |
| 5 | 99.59 | 0.41 |
| 6 | 99.42 | 0.51 |
| 7 | 99.71 | 0.29 |

This distilled trimer was polymerized as in Example 1 for a 20 hour period. The results are shown in the following table.

TABLE 2

| Example | Conversion to Polymer | LVN of Polymer | Color |
|---------|----------------------|----------------|-------|
| 4 | 49% | 0.39 | dark |
| 5 | 50% | 0.37 | dark |
| 6 | 60% | 0.56 | dark |
| 7 | 37% | 0.48 | dark |

EXAMPLES 8–11

In these examples the crude trimer was made in monochlorobenzene as in Example 1. The synthesis temperature was 122° C. The trimer solution was filtered and distilled in a ten-plate Oldershaw column at a 10:1 reflux ratio. Analysis of the trimer cut indicated 100% trimer. These apparently pure trimers were polymerized for 20 hours at 220° C. in the same manner as in Example 1. The results are shown in the following table.

TABLE 3

| Example | Conversion to Polymer | LVN of Polymer | Color |
|---------|----------------------|----------------|-------|
| 8 | 57% | 0.59 | black |
| 9 | 67% | 0.97 | black |
| 10 | 51% | 0.48 | black |
| 11 | 58% | 0.8 | clear |

EXAMPLES 12–13

In these comparative examples, the crude cyclic trimer solution was made following the same procedure used in Examples 8–10. The crude trimer solutions were filtered and then monochlorobenzene was distilled out to give concentrates containing about 28–32 weight percent monochlorobenzene. This concentrate was allowed to cool to room temperature forming a precipitate which was filtered off and washed with heptane. The crystalline precipitate analyzed as follows.

TABLE 4

| Example | Trimer | Tetramer |
|---------|--------|----------|
| 12 | 92.8 | 7.2 |
| 13 | 95.83 | 2.53 |

These crystallized trimers were polymerized for 20 and 12 hours respectively at 220° C. as in Example 1 with the following results.

TABLE 5

| Example | Conversion to Polymer | LVN of Polymer | Color |
|---------|----------------------|----------------|-------|
| 12 | 23% | — | OK |
| 13 | 57% | gel | amber |

Comparative Examples 4–13 clearly show that neither crystallization nor distillation alone is capable of consistently giving polymerization grade trimer. Examples 8–11 are of special interest in showing that even though the trimer might analyze as apparantly pure, they still contain some unknown material that results in a black polymer. At present it is not understood why otherwise satisfactory purification techniques fail to consistently give high molecular weight gel-free linear polymers of the desired viscosity and color. What is known is that the present process using the combination of crystallization and distillation has consistently given a gel-free high molecular weight linear phosphonitrilic chloride polymer.

I claim:

1. A process for purifying impure cyclic phosphonitrilic chloride to obtain polymerization grade trimer said process comprising:
   (a) crystallizing cyclic phosphonitrilic chloride trimer from a solution of impure phosphonitrilic chloride trimer in an inert solvent;
   (b) separating said crystallized trimer from said inert solvent; and
   (c) distilling the separated crystalline trimer to obtain polymerization grade trimer.

2. A process of claim 1 wherein said inert solvent comprises a major amount of a halogenated benzene.

3. A process of claim 2 wherein said halogenated benzene is monochlorobenzene.

4. A process of claim 2 wherein said solvent consist essentially of a halogenated benzene.

5. A process of claim 4 wherein said halogenated benzene is monochlorobenzene.

6. A process of claim 3 wherein said solution of impure phosphonitrilic chloride trimer in an inert solvent contains less than 50 weight percent of said solvent.

7. A process of claim 1 wherein said solvent consists essentially of monochlorobenzene.

8. A process of claim 7 wherein said solution contains less than 40 weight percent of said solvent.

9. A process of claim 8 wherein said solution contains about 25–40 weight percent monochlorobenzene.

10. A process for making polymerization grade cyclic phosphonitrilic chloride trimer, said process comprising
    (a) reacting ammonium chloride with phosphorus pentachloride in a halogenated benzene solvent at 100–160° C. to form a solution of impure phosphonitrilic chloride trimer said solution containing over 50 weight percent solvent.
    (b) distilling a portion of said halogenated benzene solvent from said solution to obtain a concentrated solution containing less than 50 weight percent halogenated benzene,
    (c) cooling said concentrated solution to form a precipitate of phosphonitrilic chloride trimer,
    (d) separating said precipitate from the halogenated benzene phase and
    (e) distilling said precipitate to recover polymerization grade phosphonitrilic chloride trimer.

11. A process of claim 10 wherein step (e) is conducted by first removing a small forecut of 0.1–10 weight percent of said precipitate and then continuing the distillation to remove a heart-cut of polymerization grade phosphonitrilic chloride trimer.

12. A process of claim 11 wherein the precipitate separated in step (d) is washed with an aliphatic hydrocarbon having a boiling point in the range of about 40°–150° C.

13. A process of claim 11 wherein said halogenated benzene solvent consist mainly of monochlorobenzene.

14. A process of claim 13 wherein the steps (b), (e) and (f) are conducted at reduced pressure.

15. A process of claim 14 wherein said concentrated solution contains less than about 40 weight percent monochlorobenzene.

16. A process for making a polymerization grade cyclic phosphonitrilic chloride trimer, said process comprising
    (a) reacting about 1.0–1.5 moles of ammonium chloride with 1 mole of phosphorus pentachloride in a monochlorobenzene solvent at a temperature of 100–150° C. to form a solution of impure phosphonitrilic chloride trimer, said solution comprising at least 70 weight percent monochlorobenzene,
    (b) distilling solvent from said solution to form a hot concentrated solution which comprises less than about 50 weight percent monochlorobenzene,
    (c) cooling said hot concentrated solution to a temperature which causes precipitation of phosphonitrilic chloride trimer,
    (d) separating said phosphonitrilic chloride trimer precipitate from the solvent phase,
    (e) distilling a forecut of at least 0.1 weight percent of said trimer precipitate from said trimer precipitate leaving topped trimer and
    (f) distilling said topped trimer to obtain as the distillate said polymerization grade cyclic phosphonitrilic chloride trimer.

17. A process of claim 16 wherein said solution of impure phosphonitrilic chloride trimer is filtered to remove unreacted ammonium chloride.

18. A process of claim 17 wherein the distillation in step (b) is conducted at reduced pressure to form a hot concentrated solution which contains about 25–40 weight percent monochloro benzene.

19. A process of claim 18 wherein said distillation in steps (e) and (f) are conducted at a reduced pressure of about 50–600 Torr.

20. A process of claim 19 wherein said phosphonitrilic chloride precipitate separated in step (d) is washed with an aliphatic hydrocarbon boiling in the range of about 50–150° C.

* * * * *

UNITED STATES PATENT AND TRADEMARK OFFICE
CERTIFICATE OF CORRECTION

PATENT NO. : 4,627,967

DATED : DECEMBER 9, 1986

INVENTOR(S) : W. DIRK KLOBUCAR

It is certified that error appears in the above-identified patent and that said Letters Patent is hereby corrected as shown below:

Column 1, line 11 reads "old-rings" and should read
-- o-rings -- .

Column 3, line 55 reads "distilling" and should read
-- (e) distilling -- .

Column 6, lines 13-14 reads "trimer cut was" and should read -- trimer cuts were -- .

Column 7, line 56, reads "Claim 1" and should read
-- Claim 6 -- .

Signed and Sealed this

Twenty-eighth Day of April, 1987

Attest:

DONALD J. QUIGG

*Attesting Officer*  *Commissioner of Patents and Trademarks*